May 30, 1961     P. T. BRANTINGHAM     2,986,253
CLUTCH MEMBER
Original Filed Oct. 5, 1953     2 Sheets-Sheet 1
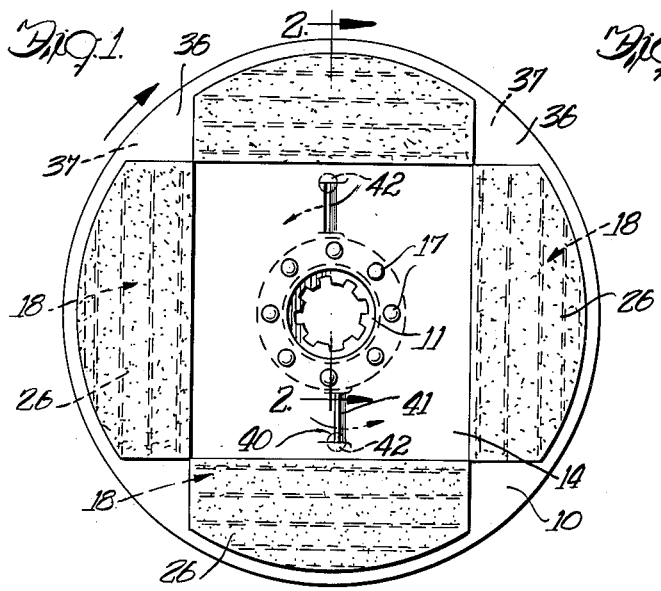
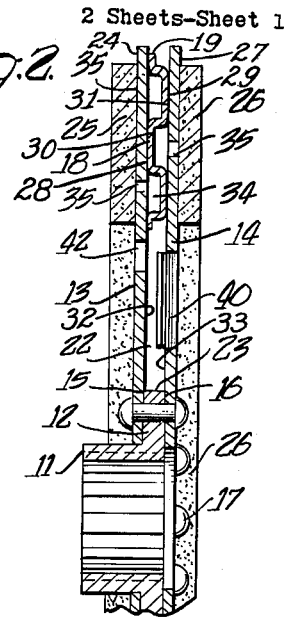
INVENTOR
PAUL TALBOTT BRANTINGHAM
Paul O. Pippel
ATTORNEY May 30, 1961  P. T. BRANTINGHAM  2,986,253
CLUTCH MEMBER
Original Filed Oct. 5, 1953  2 Sheets-Sheet 2
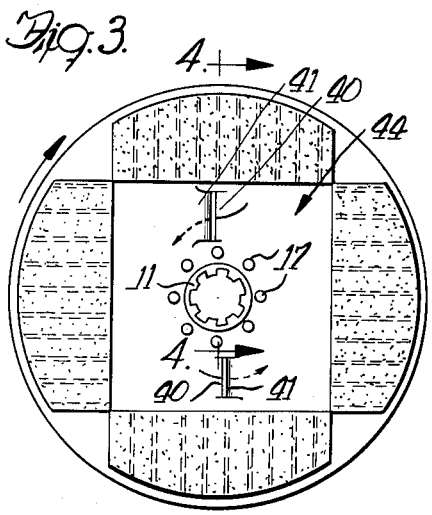
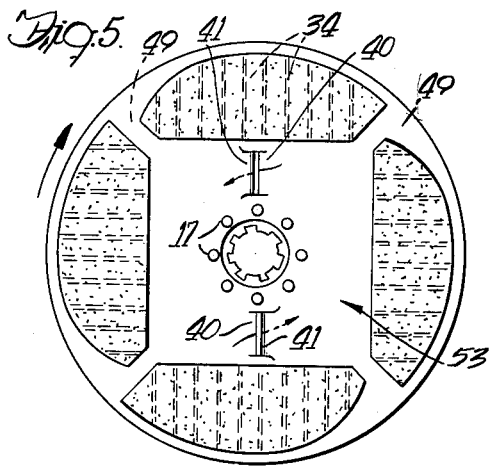
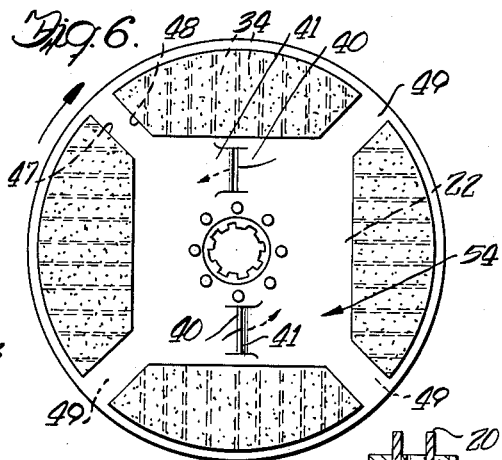
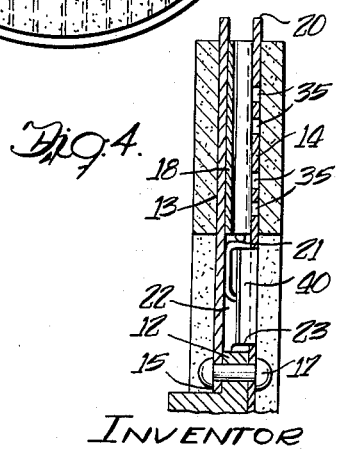
INVENTOR
PAUL TALBOTT BRANTINGHAM
Paul O. Pippel
ATTORNEY

# United States Patent Office 2,986,253
Patented May 30, 1961

2,986,253
CLUTCH MEMBER

Paul Talbott Brantingham, Glen Ellyn, Ill., assignor to International Harvester Company, a corporation of New Jersey Original application Oct. 5, 1953, Ser. No. 384,135. Divided and this application Oct. 7, 1957, Ser. No. 688,613

12 Claims. (Cl. 192—113)

This invention relates to clutch mechanisms, and more particularly to the construction of air-cooled clutch members. The present application is a division of applicant's patent application Serial No. 384,135, filed October 5, 1953, now abandoned, for Clutch Member and assigned to the assignee of the present invention.

The present invention is primarily concerned with an improved construction for those members of a clutch mechanism of the type employed in a power transmission system wherein two or more relatively rotatable clutch members having facings or surfaces of friction material are periodically moved axially with respect to each other to bring mating friction facings into engagement under pressure and thus cause the clutch members to rotate in unison to effect completion of the power transmission train. During the engaging operation a considerable amount of heat is generated by virtue of the frictional losses occasioned when the mating surfaces are brought into contact with each other. The heat thus generated has an adverse effect on the facing material and other components of the clutch members and tends to shorten the effective operational life of the clutch mechanism. This is especially true in power transmission systems wherein the clutch mechanism must be repeatedly engaged and disengaged such as in automotive vehicle transmission systems. It is therefore an important object of the present invention to mitigate the deleterious effect of the generated heat by providing a friction clutch member construction in which is embodied efficient means for dissipating the heat continually.

Another object is the provision of a friction clutch member including a pair of space plates, each of which has a plurality of circumferentially spaced segments of friction material secured to the outer surface thereof, whereby air is permitted to flow between the plates adjacent the segments to cool the clutch member and to expose a predetermined area of the pressure plate and flywheel contact surfaces to cooling effect of air circulation.

Still another object is the provision of a clutch member having novelly disposed and formed passages and passageways provided therein and means circulating air through the passages and passageways while the clutch member is rotated whereby air will continually cool the clutch member.

A further object is to provide unique scoop means incorporated in a clutch member for creating a forced flow of cooling air through the member when the member is rotated and to provide means for directing the flow of air through the clutch assembly and clutch housing to prevent overheating thereof.

The foregoing and other important objects and desirable features inherent in and encompassed by the invention together with many of the purposes and uses thereof will become readily apparent from a reading of the ensuing description in conjunction with the annexed drawings in which:

Figure 1 is a view of a clutch member constructed in accordance with the invention;

Figure 2 is a cross sectional view taken substantially along line 2—2 of Figure 1;

Figure 3 is a view similar to Figure 1 showing a modified form of the invention;

Figure 4 is a cross sectional view taken substantially along the line 4—4 of Figure 3;

Figure 5 is a further modification of the invention; and

Figure 6 is a view similar to Figure 3 showing additional air outlet means.

Referring to the drawings in detail, wherein like reference characters represent like elements throughout the various views, a rotatable clutch member 10 is shown which includes a spline hub 11 adapted to be secured to a shaft (not shown) of a power transmission system for rotation therewith. As shown in Figure 2, the hub 11 is provided with a radially projecting flange 12. A pair of axially spaced, ring-like plates 13, 14 have their inner peripheral edge portions 15, 16, respectively, abutting respectively oppositely facing surfaces of the flange 12 and are rigidly secured to the hub 11 by means of a plurality of circumferentially spaced rivets 17 which extends through the peripheral edge portions 15 and the flange 12.

Disposed between and rigidly secured to the plates 13, 14 by welding or other suitable means are spacing elements 18, and for the purpose of the invention four circumferentially spacing elements are shown. Each of the spacing elements 18 has its outermost edge 19 disposed adjacent the outer peripheral edges 20 of the plates 13, 14 and is curved to conform to the circle defined by the peripheral edges 20. The innermost edges 21 of the spacing elements 18 are radially spaced from the rotational axis of the clutch member 10 and lie along the central portions of chords of a circle defined by the peripheral edges 20 of the plates 13, 14. From the foregoing it will be appreciated that the outer, side, and innermost limits of a compartment, designated generally by numeral 22, are defined, respectively, by the innermost edges 21 of the spacing elements 18, portions of the plates 13, 14 and the peripheral edge 23 of the flange 12.

Secured to the outwardly facing surface 24 of the plate 13, by any suitable means, are four segments 25 made of conventional friction clutch lining material. Each segment 25 is disposed in axial alignment with a respective spacing element 18 and a segment 26 similarly secured to the outwardly facing surface 27 of the plate 14. In operation, the friction facings of a pair of pressure plates (not shown) disposed on each side of the clutch member 10 are moved axially and forced into frictional engagement with the segments 25, 26 in order to engage the clutch mechanism. The spacing elements 18 not only serve as separators for stiffening the plates 13, 14 but also serve as means for permitting cooling air to flow between the segments 25, 26, as will be pointed out hereinafter.

The spacing elements 18 shown in Figures 1 and 2 are each of a one piece construction and are formed of a plurality of oppositely projecting channel portions 28 and 29. The webs 30, 31 respectively of the channel portions 28, 29 abut and are secured respectively to the inwardly facing surfaces 32, 33 of the plates 13 and 14. The channel portions 28, 29 of the spacing elements 18 lie along central portions of chords of the circle defined by the peripheral edges 20 of the plates 13 and 14. It will be appreciated that a plurality of passages 34 are thus provided which have their longitudinal axes lying along chords of the circle defined by the peripheral edges 20 of the plates 13 and 14 and each passage 34 has an end thereof opening into a respective space 37 between adjacent ends of the spacing elements 18 to thus permit air to circulate between the plates to cool them as well as the segments 25, 26 which they carry. A series of apertures 35, formed in the plates 13, 14, facilitate the conduction of heat from the segments 25, 26 to the passages 34. While making the two friction engaging surfaces of the clutch member 10 in segment form rather than a continuous single piece as in conventional constructions, air can flow in the space 36 between the adjacent ends of the segments and the space 37 between the adjacent ends of the spacing elements 18, as the clutch member 10 is rotated to carry away the heat generated during the clutch engaging operation. By exposing a portion of the pressure plate surfaces, an increase in the rate of heat dissipation is encouraged. Each of the passages 34 has its ends opening into the spaces 37 provided between the adjacent ends of the adjacent spacing elements 18 whereby cooling air can freely circulate between the plates 13 and 14 and segments 25, 26 to carry away the heat generated during the clutch engaging operation.

The clutch member 10 is also provided with means for positively circulating air through the compartment 22 while the clutch member is rotating. A pair of radially extending slots 40, spaced from and on diametrically opposite sides of the rotational axis of the clutch member 10 are provided in the plate 14. Disposed on one side of each slot 40 is a scoop 41 arranged to force air through the slot into the interior of the compartment 22 during rotation of the clutch member 10 in a clockwise direction as viewed in Figure 1. The portion of the plate 13 defining one wall of the compartment 22 is provided with air outlet openings 42 for permitting the cooling air to be discharged from the compartment. It will be appreciated that the plates 13, 14 as well as the other components of the clutch member 10 are continually cooled by air passing through the compartment 22 and through the passages 34.

The clutch member 44 shown in Figure 3, represents an alternative form of the clutch member 10 shown in Figure 1 and described above. The clutch member 44 is constructed in substantially the same manner as the clutch member 10 with the exception of the disposition of the channel portions 28, 29 of the spacing elements 18 which lie along end portions of chords of the circle defined by the peripheral edges 20 of the plates 13 and 14 and permit air to circulate between the plates to cool them as well as the segments 25, 26 which they carry. The longitudinal axes of the passages 34 formed by this construction lie along chords of a circle defined by the peripheral edges 20 of the plates 13 and 14 and each passage 34 has one end thereof opening into the compartment 22 to thus permit air to circulate between the plates to cool them as well as the segments 25, 26 which they carry.

The plate 14 of the clutch member 44 is provided with scoops 41 and air inlet slots 40 which are constructed and function in the same manner as scoops 41 and slots 40 incorporated in the clutch member 10 shown in Figure 1. However, unlike the clutch member 10, the air forced into the compartment 22 is discharged to the atmosphere by flowing outwardly from the compartment 22 through the passages 34.

An alternative clutch member construction is shown in Figure 5 and designated generally by numeral 53. The plate 14 is provided with scoops 41 and air inlet slots 40 and in this respect is similar to the plate construction incorporated in the clutch member 44 shown in Figure 3. During rotation of the clutch member 52, air enters the compartment 22 through the radial passageways 49 and the inlet slots 40 and is expelled from the compartment through the passages 34.

In Figure 6 one end edge 47 of each spacing element 18 is arcuately spaced from and parallel to an end edge 48 of an adjacent spacing element whereby four circumferentially spaced, radially extending passageways 49 are formed leading to the compartment 22 of clutch member 54 to the atmosphere. Scoops 41 and air inlet slots 40 are provided in plate 14 for forcing air into the compartment 22 during rotation of the clutch member 55 in the direction indicated by the arrow. The air is discharged from the compartment 22 through the passageways 49 as well as the passages 34.

Additional cooling means are provided for cooling the clutch member 53 shown in Figure 5. Each pair of axially aligned segments 25, 26 has the same configuration as the spacing element 18 interposed therebetween and each of the segments 25, 26 has its end edges arcuately spaced from the ends of adjacent segments to thereby form scoops for causing air to flow inwardly over the outwardly facing surfaces of the plates 13 and 14 to cool them when the clutch member is rotated.

The embodiments of the invention chosen for the purposes of illustration and description herein are those preferred for achieving the objects of the invention and for developing the utility thereof in the most desirable manner due regard being had to existing factors of economy, simplicity of design and construction, and the improvements sought to be effected. It will be appreciated, therefore, that the particular structural and functional aspects emphasized herein are not intended to exclude, but rather to suggest, such other modifications and adaptations of the invention as fall within the spirit and scope of the invention as defined in the appended claims.

What is claimed is:

1. A clutch member comprising a pair of axially spaced plates; a plurality of circumferentially spaced, rigid spacing means interposed between and rigidly interconnecting said plates, said spacing means extending inwardly from substantially the peripheral edges of said plates and the inner edges of said spacing means being radially spaced from the rotational axis of the clutch member and being adapted to maintain one of said plates in a fixed, axially spaced relationship with respect to the other of said plates, at least a portion of each circumferential edge of each spacing means being circumferentially spaced from at least a portion of the adjacent circumfential edge of an adjacent spacing means, each of said spacing means having a plurality of parallel passages extending therethrough for the circulation of air, the longitudinal axes of said passages lying along chords of the circle defined by the periphery of said plates, the inner edges and portions of said plates defining the outer and side limits, respectively, of a compartment; a plurality of pairs of friction segments, the segments of each pair being secured to the outer face portions of said plates in axial alignment with a respective spacing means; and means for causing a forced circulation of air through said compartment when the clutch member is rotated including a plurality of radially extending, elongated slots formed in one of said plates, a scoop associated with each slot, each of said scoops lying along a radially extending edge of a respective slot and projecting axially outwardly from the outer surface of said plate having said slots formed therein, said scoops forcing air into said compartment through said slots when said clutch member is rotated in a particular direction, and air outlet means for emitting air from said compartment.

2. A clutch member comprising a pair of axially spaced plates; a plurality of circumferentially spaced, rigid spacing means interposed between and rigidly interconnecting said plates, said spacing means extending inwardly from substantially the peripheral edges of said plates and the inner edges thereof being radially spaced from the rotational axis of the clutch member and being adapted to maintain one of said plates in a fixed axially spaced relationship with respect to the other of said plates, at least a portion of each circumferential edge of each spacing means being circumferentially spaced from at least a portion of the adjacent circumferential edge of an adjacent spacing means, each of said spacing means having a plurality of parallel passages therethrough for the circulation of air, the longitudinal axes of said passages lying along chords of the circle defined by the periphery of said plates, said inner edges and portions of said plates defining the outer and side limits of a compartment; friction facing material secured to the outer face portions of said plates; and means for circulating air through said compartment during rotation of said clutch member including a plurality of radially extending, elongated slots formed in one of said plates, a plurality of scoops associated with said slots, each of said scoops lying along a radially extending edge of a respective slot and projecting axially outward from the outer surface of said plate having said slots formed therein, said scoops forcing air into said compartment through said slots when said clutch member is rotated in a particular direction.

3. A clutch member substantially as set forth in claim 2, in which, air outlet means are provided for emitting air from said compartment, said air outlet means includes outlet openings formed in the other of said plates through which the air is emitted from said compartment.

4. A clutch member comprising a hub having a radial flange; a pair of ring-like plates having their inner marginal edge portions abutting respective opposite sides of said flange and secured thereto; a plurality of circumferentially spaced, rigid spacing means interposed between and rigidly interconnecting said plates, said spacing means extending inwardly from substantially the outer peripheral edges of said plates and the inner edges of said spacing means being radially spaced from the rotational axis of the clutch member and being adapted to maintain one of said plates in a fixed, axially spaced relationship with respect to the other of said plates, at least a portion of each circumferential edge of each spacing means being circumferentially spaced from at least a portion of the adjacent circumferential edge of an adjacent spacing means, each of said spacing means having a plurality of parallel passges therethrough for the circulation of air, the longitudinal axes of said passages lying along chords of the circle defined by the periphery of said plates, the inner edges of said spacing means, portions of said plates, and the peripheral edge of said flange defining the outer, side, and inner limit, respectively, of a compartment; a plurality of a pair of friction segments, one segment of each pair being secured to the outer face of one of said plates in axial alignment with a respective spacing means, the other segment of each pair of means secured to the outer face of the other plate in axial alignment with the same spacing means; and means for causing a forced circulation of air through said compartment when the clutch member is rotated including a plurality of radially extending, elongated slots formed in one of said plates, a plurality of scoops associated with said slots, each of said scoops lying along a radially extending edge of a respective slot and projecting axially outwardly from the outer surface of said plate having said slots formed therein, said scoop forcing air into said compartment through said slots when said clutch member is rotated in a particular direction.

5. A clutch member substantially as set forth in claim 4, in which, air outlet means are provided through which air is emitted from said compartment, said air outlet means includes outlet openings formed in the other of said plates through which air is emitted from said compartment.

6. A clutch member substantially as set forth in claim 1, in which, each end of each of said parallel passages opens into a respective circumferential space between the circumferentially spaced edge portion of adjacent spacing means.

7. A clutch member substantially as set forth in claim 4, in which, each of said parallel passages has one end thereof opening into said compartment and establish air flow communication between the atmosphere and the interior of said compartment.

8. A clutch member substantially as set forth in claim 2, wherein the end edges of each spacing means is arcuately spaced, respectively, from the end edges of adjacent spacing means whereby a plurality of radially extending passageways are formed for establishing communication between said compartment and the atmosphere, and a plurality of second scoop means for causing a forced circulation of air through said radially extending passageways into the interior of said compartment when the clutch member is rotated in a particular direction.

9. A clutch member substantially as set forth in claim 8, wherein each of said second scoop means includes the outermost portions of the end edges of adjacent spacing means, one of said portions lying along a radially extending line and other portion lying along a curve having a radius of curvature less than the radii of said plates.

10. A clutch member substantially as set forth in claim 2, wherein the circumferential edge of each spacing means is circumferentially spaced from the circumferential edge of an adjacent spacing means to define a plurality of radially extending passageways extending between said compartment and the atmosphere.

11. A clutch member substantially as set forth in claim 10, in which, one end of each of said parallel passages extending through said spacing means opens into said compartment and said parallel passages establish air flow communication between the interior of said compartment and the atmosphere.

12. A clutch member substantially as set forth in claim 11, in which, a plurality of second scoop means associated with said radially extending passageways are provided for causing a forced circulation of air through said radially extending passageways into the interior of said compartment when the clutch member is rotated in a particular direction, each of said second scoop means including the outermost portions of the end edges of adjacent spacing means, one of said portions lying along a radially extending line and the other portion lying along a curve having a radius of curvature less than the radii of said plates.

References Cited in the file of this patent

UNITED STATES PATENTS

| | | |
|---|---|---|
| 719,033 | Norris | Jan. 27, 1903 |
| 2,184,506 | Eason | Dec. 26, 1939 |
| 2,197,232 | Wood | Apr. 16, 1940 |
| 2,262,709 | Lambert | Nov. 11, 1941 |
| 2,380,900 | Wellman | July 31, 1945 |
| 2,706,549 | Emrick | Apr. 19, 1955 |
| 2,713,928 | Pohl | July 26, 1955 |
| 2,767,817 | Davis | Oct. 23, 1956 |

FOREIGN PATENTS

| | | |
|---|---|---|
| 708,038 | Germany | Feb. 28, 1941 |